(12) United States Patent
Jang

(10) Patent No.: US 12,133,780 B2
(45) Date of Patent: Nov. 5, 2024

(54) ENDODONTIC FILE FOR DENTAL NERVE TREATMENT WITH IMPROVED FRACTURABLE AREA

(71) Applicant: Cheon Seok Jang, Ansan-si (KR)

(72) Inventor: Cheon Seok Jang, Ansan-si (KR)

( * ) Notice: Subject to any disclaimer, the term of this patent is extended or adjusted under 35 U.S.C. 154(b) by 352 days.

(21) Appl. No.: 17/765,618

(22) PCT Filed: Aug. 25, 2020

(86) PCT No.: PCT/KR2020/011311
§ 371 (c)(1),
(2) Date: Mar. 31, 2022

(87) PCT Pub. No.: WO2021/085824
PCT Pub. Date: May 6, 2021

(65) Prior Publication Data
US 2022/0378547 A1    Dec. 1, 2022

(30) Foreign Application Priority Data

Oct. 28, 2019    (KR) .......................... 10-2019-0134844

(51) Int. Cl.
*A61C 5/42* (2017.01)
*A61C 5/46* (2017.01)
*A61C 5/48* (2017.01)

(52) U.S. Cl.
CPC .................. *A61C 5/42* (2017.02); *A61C 5/46* (2017.02); *A61C 5/48* (2017.02); *A61C 2201/00* (2013.01)

(58) Field of Classification Search
CPC . A61C 5/40–48; A61C 2201/00; A61B 17/16; A61B 17/1615; B23B 2231/0212;
(Continued)

(56) References Cited

U.S. PATENT DOCUMENTS 308,424 A  *  11/1884  Morey .................... A61C 3/02
                                                   433/128
2004/0018471 A1*  1/2004  Giorno ................. A61C 8/0089
                                                   433/221
(Continued)

FOREIGN PATENT DOCUMENTS

CN    1934140 A  *  3/2007  ................ C08F 2/46
EP    0985383 A2  *  3/2000
(Continued)

*Primary Examiner* — Jacqueline T Johanas
*Assistant Examiner* — Jennifer P Connell
(74) *Attorney, Agent, or Firm* — KORUS Patent, LLC; Seong Il Jeong

(57) ABSTRACT

An endodontic file for dental nerve treatment according to the present invention comprises: a helical shaped blade that is to be inserted into a root canal, remove dental nerve, and enlarge the root canal; a head that is detachably inserted into a rotary power tool, and a connection part extending by a predetermined length between the head and the blade and having a diameter smaller than that of each of a contact end of the blade and the head. According to the endodontic file for dental nerve treatment, by forming the connection part of the endodontic file with an adjusted thickness or shape such as a thin thickness so that stress generated during rotation of the endodontic file is concentrated on the connection part rather than the blade, the endodontic file is induced to be fractured outside the tooth rather than inside the tooth root, thereby allowing fractured pieces to be easily found and removed.

7 Claims, 9 Drawing Sheets

(58) Field of Classification Search
CPC ........ B23B 2231/0252; B23B 2210/12; B23B 2251/241–245; Y10T 408/907
See application file for complete search history.

(56) References Cited

U.S. PATENT DOCUMENTS

| | | | | |
|---|---|---|---|---|
| 2004/0058298 A1* | 3/2004 | Brava | ...................... | A61C 5/42 |
| | | | | 433/102 |
| 2007/0101827 A1* | 5/2007 | Quan | ...................... | A61C 3/02 |
| | | | | 451/48 |
| 2010/0173263 A1* | 7/2010 | Tetsuka | .................... | A61C 3/02 |
| | | | | 433/165 |
| 2015/0230902 A1* | 8/2015 | Andreou | .................. | A61C 5/42 |
| | | | | 433/224 |
| 2016/0128800 A1* | 5/2016 | Kim | ......................... | A61C 5/48 |
| | | | | 433/102 |
| 2017/0143450 A1* | 5/2017 | Dabar | ...................... | A61C 5/42 |
| 2019/0296864 A1* | 9/2019 | Li | .......................... | H04W 76/28 |
| 2020/0214798 A1* | 7/2020 | Kim | ......................... | A61C 5/48 |

FOREIGN PATENT DOCUMENTS

| | | | |
|---|---|---|---|
| JP | H11-290344 A | 10/1999 | |
| JP | 2008-528652 A | 7/2008 | |
| KR | 20-1993-0004427 U | 3/1993 | |
| KR | 10-2008-0049712 A | 6/2008 | |
| KR | 10-2010-0018914 A | 2/2010 | |
| KR | 10-1344570 B1 | 12/2013 | |
| KR | 10-2018-0106967 A | 10/2018 | |
| KR | 10-2049703 B1 | 11/2019 | |
| WO | WO-2006034281 A1 * | 3/2006 | .............. A61C 1/00 |
| WO | 2018/002951 A1 | 1/2018 | |

\* cited by examiner

ENDODONTIC FILE FOR DENTAL NERVE TREATMENT WITH IMPROVED FRACTURABLE AREA

FIELD OF THE INVENTION

The present invention relates to an endodontic file for dental nerve treatment with an improved fracturable area, and more particularly, an endodontic file with an improved fracturable portion to solve a safety problem caused by fracture of a distal end of the endodontic file inside the tooth root.

BACKGROUND OF THE INVENTION

An endodontic file is a tool used to remove pulp in the root canal and enlarge the root canal during nerve treatment. Generally, an endodontic file consists of a head mounted on a dental rotary power tool, a blade to be inserted into the root canal to remove pulp, and a connection part connecting between the head and the blade. An endodontic file is widely used in dentistry, and various endodontic files are being developed to effectively remove damaged pulp. When these endodontic files rotate inside the root canal, the blade of the endodontic file gets stressed by resistance against a force that removes damaged pulp and is frequently fractured. Since fragments of the endodontic file are very small and embedded in the root canal, it is not easy to collect and remove them from the root canal.

In order to solve this problem, Korean Patent Publication No. 10-201800106967 'Endodontic File for Tooth Nerve Treatment' includes: a head part inserted into and detachably coupled to a rotary power tool; a tissue removal blade part that is inserted into a patient's root canal to remove a damaged dental nerve, and a stress distribution part consisting of a plurality of helical coil spring spokes having the same inner diameter and the same central axis within the same section in a longitudinal direction between the head part and the tissue removal blade part. In addition, the prior art describes that the plurality of helical coil spring spokes are preferably formed by being carved to helically penetrate in a longitudinal direction along a central axis of rotation. According to this technology, when the endodontic file rotates, excessive stress is generated in the tissue removal blade of the endodontic file. However, a plurality of coil spring spokes provided in the endodontic file partially absorb the stress and thus can reduce the stress generated in the tissue removal blade.

However, although this technology reduces the possibility of fracture of the endodontic file, since an actual endodontic file has a very small diameter, fracture cannot be prevented realistically. Therefore, the known technologies do not provide solutions for removing minute fragments generated during fracture of the endodontic file.

Accordingly, there is an urgent need to develop a novel and advanced endodontic file for dental nerve treatment with the improved fracturable area that can reduce the possibility of fracture and that fragments thereof can be easily removed if the endodontic file is fractured.

DETAILED DESCRIPTION OF THE INVENTION

Technical Problems

The present invention has been devised to overcome the problems of the technology above. The main purpose of the present invention is to propose an endodontic file with an improved fracturable area that can reduce a possibility of fracture when the endodontic file inserted into the tooth root rotates, and to provide an endodontic file of which a thickness is formed in various sizes to allow the endodontic file to be selectively used according to the various situations.

Another object of the present invention is to provide a function that can minimize a possibility of fracture of the endodontic file by forming a plurality of slits on a surface of the endodontic file to limit a fracturable area to the slits and specializing the plurality of slits.

Another object of the present invention is to provide a function that can limit the fracturable area by forming a portion of the endodontic file in a concavely recessed shape and that can ensure a stable rotational operation of the endodontic file by forming the concavely recessed shape in a specific shape.

An additional object of the present invention is to enhance durability of the endodontic file by providing a coating layer on a portion of the endodontic file.

SUMMARY OF THE INVENTION

To achieve the object mentioned above, an endodontic file for dental nerve treatment according to the present invention comprises: a helical shaped blade that is to be inserted into a root canal, remove dental nerve, and enlarge the root canal; a head that is detachably inserted into a rotary power tool, and a connection part extending by a predetermined length between the head and the blade and having a diameter smaller than that of each of a contact end of the blade and the head.

In addition, the connection part is formed with a plurality of slits that are recessed at regular intervals along a longitudinal direction of the connection part along a circumference of the surface of the connection part.

Furthermore, a cross section of the slit is provided with: a first rounded section extended to protrude from a portion where a recess starts toward a center of the slit to be rounded with a first radius of curvature; a second rounded section extended to be recessed from an end of the first rounded section toward a bottom surface of the slit with a second radius of curvature that is larger than the first radius of curvature, and a third rounded section protruding from an end portion where the second rounded sections meet each other toward a portion where the recess start, with a third radius of curvature that is smaller than the first and the second radius of curvature.

Technical Effects of the Invention

An endodontic file for dental nerve treatment according to the present invention has the following technical effects.

1) By forming a connection part of the endodontic file with a thinner thickness, the connection part of the endodontic file receives more stress than the part inserted into the tooth root, and thus, the endodontic file is fractured outside the tooth rather than inside the tooth root, thereby allowing fractured pieces to be easily found and removed.

2) By forming a plurality of slits on a portion of the surface of the endodontic file and specializing these slits, stress can be distributed over the entire endodontic file so that the endodontic file is not easily fractured as a whole. In addition, even if the endodontic file is fractured, since a diameter of the slit area is smaller than those of other areas, fracture can occur in the slit area.

3) By forming a portion of the surface of the endodontic file in a concavely recessed form, stress can be concentrated on the concave area and fracture can be occurred in this area. Furthermore, the concavely recessed area with an improved shape can prevent excessive concentration of stress thereto.

4) By providing a coating layer formed on a portion of the endodontic file through a specific component and a manufacturing method, durability of the endodontic file can be strengthened, and the endodontic file can be prevented from being easily fractured.

DESCRIPTION OF MAIN REFERENCE NUMBERS IN THE DRAWINGS

Figure 1:
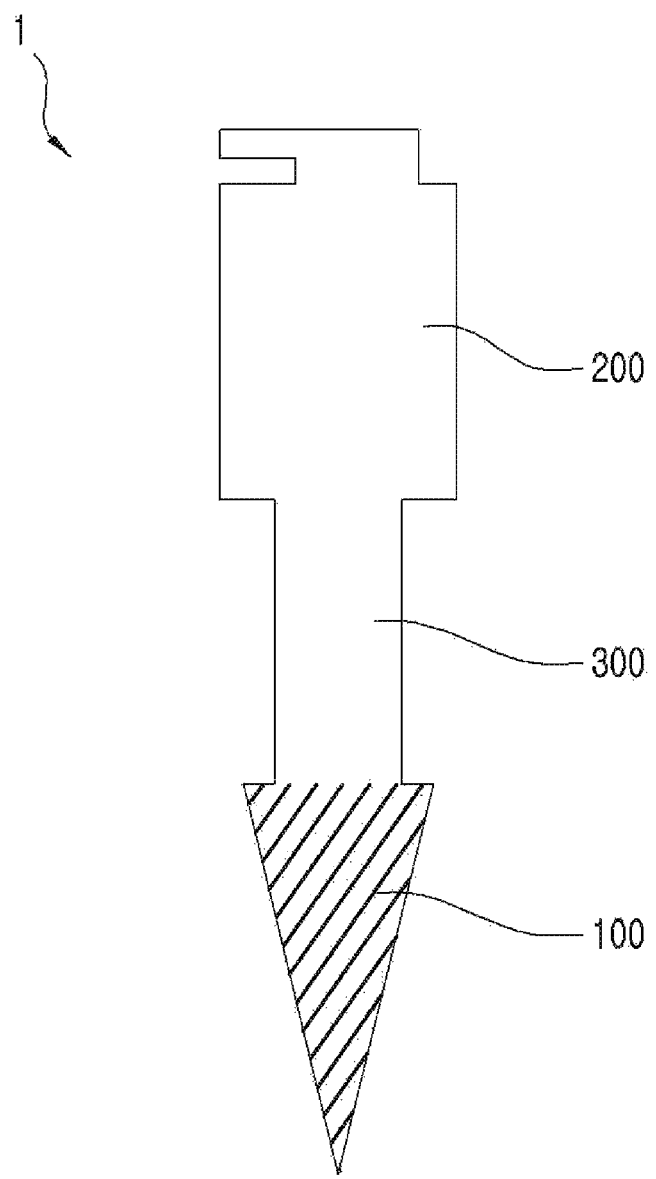
FIG. 1 is a perspective view illustrating a structure of an endodontic file according to an embodiment of the present invention.

1: endodontic file,
100: blade
200: head,
300: connection part
310: screw thread,
320: slit
321: first rounded section,
322: second rounded section
323: third rounded section,
330: eccentric slit
340: concave part,
341: recessed groove
342: first extension part,
343: second extension part
344: third extension part,
350: eccentric groove

BEST MODE FOR THE INVENTION

The present invention provides an endodontic file for dental nerve treatment with an improved fracturable area, the endodontic file comprising: a helical shaped blade that is to be inserted into a root canal, remove dental nerve, and enlarge the root canal; a head that is detachably inserted into a rotary power tool; a connection part extending by a predetermined length between the head and the blade and having a diameter smaller than that of each of a contact end of the blade and the head, wherein a coating layer is formed on a surface of the connection part through a process of coating the surface of the connection part with a coating solution containing zinc sulfide powder and irradiating the surface of the connection part with ultraviolet rays for 1 to 10 minutes.

MODES FOR THE INVENTION

Hereinafter, preferred embodiments of the present invention will be described in detail with reference to the accompanying drawings. The accompanying drawings are not drawn to scale, and like reference numbers in each drawing denote like components or elements.

Figure 2A:
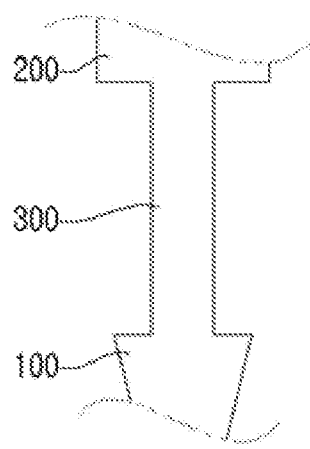
FIGS. 2A-2C are cross sectional views illustrating various diameters of a connection part of the endodontic file according to the present invention.
Figure 2B:
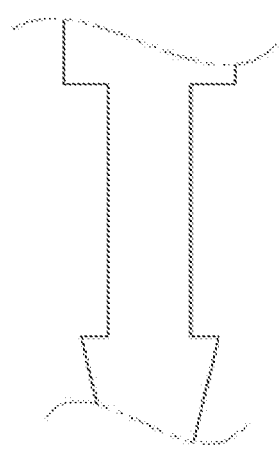
Figure 2C:
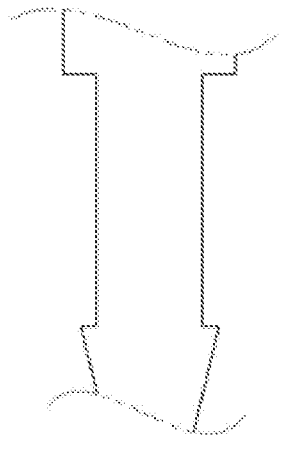

FIG. 1 is a perspective view illustrating a structure of an endodontic file, and FIGS. 2A-2C are cross sectional views illustrating various diameters of a connection part of the endodontic file according to the present invention.

The endodontic file 1 of the present invention is a medical tool used for dental nerve treatment, and an overall appearance of the endodontic file is similar to the shape of an awl. That is, like the known endodontic file, the endodontic file 1 comprises a blade 100 inserted into the tooth root, the connection part 300 extended from the blade 100, and a head 200 that is connected to the connection part 300 and can be mounted on a dental rotary power tool.

Specifically, the blade 100 of the present invention has a conical shape as a portion to be inserted into the nerve positioned inside the tooth. By forming a groove on a surface of the blade 100 in a helical shape, or a twisted spiral shape, a rotational force is concentrated on a tip of the blade 100 and can be gently inserted into the inside of the tooth. The blade 100 may be made of various materials. For example, a Ni—Ti alloy, which has high flexibility, excellent biocompatibility, and high resistance to corrosion, may be used.

In addition, the head 200 of the present invention is a part that can be connected to a dental rotary power tool to rotate the blade 100. The head 200 is a structure extended in a longitudinal direction, and a cross section of the head 200 is a circular shape with a constant diameter. Since the head 200 is formed in a cylindrical shape, the endodontic file 1 can be easily gripped despite its short length and can be easily combined with the rotary power tool. Accordingly, a rotational force of the rotary power tool is not lost and can be transmitted to the blade 100 of the endodontic file 1.

The connection part 300 of the present invention extends between the blade 100 and the head 200 by a predetermined length and serves to transmit the rotational force generated in the head 200 to the blade 100.

In addition, the connection part 300 may be formed of the same material as the blade 100 but may be formed of other alloy material with high strength to prevent being fractured too easily.

In addition, the connection part 300 can be formed to have various diameters, as seen in FIGS. 2A-2C. In consideration of high stress applied to the blade 100 positioned at the bent root canal, the connection part 300 is designed to be weaker than the blade 200 so that the stress is concentrated on the connection part 300 and is fractured first before fracture of the blade 200.

FIG. 2A illustrates a shape in which the connection part 300 of the endodontic file 1 has a relatively small diameter; FIG. 2B illustrates a shape in the connection part 300 of the endodontic file 1 has a medium diameter; and FIG. 2C illustrates a shape in which the connection part 300 of the endodontic file 1 has a relatively large diameter. The tooth root into which the endodontic file 1 of the present invention is inserted has a curved shape mainly at a central portion or an end portion of the tooth root. Accordingly, by forming various diameters of the connection part 300, the present invention enables to selectively use the endodontic file 1 corresponding to the curved shape of the tooth root. For example, in order to insert the endodontic file 1 into a tip of the tooth root, the endodontic file 1 having the connection part 300 with a thin thickness as shown in FIG. 2A can be used, and to insert the endodontic file 1 into an upper portion of the tooth root, the endodontic file 1 having the connection part 300 with a thick thickness as shown in FIG. 2C can be used.

Figure 3A:
FIGS. 3A-3B are perspective views illustrating fractured states of the known endodontic file and the endodontic file according to the present invention.
Figure 3B:
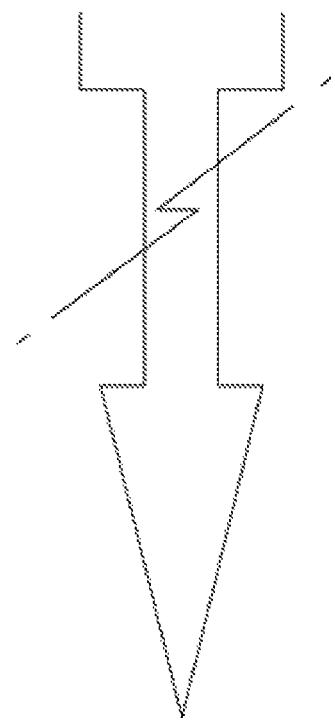

Referring to FIGS. 3A-3B, the endodontic file 1 having such connection unit 300 will be described below.

FIGS. 3A-3B are perspective views illustrating fractured states of the known endodontic file and the endodontic file according to the present invention. Specifically, FIG. 3A is a fractured state of the known endodontic file, and FIG. 3B is a fractured state of the endodontic file 1 according to the present invention.

According to the prior art mentioned in the background described above, in order to prevent the tissue removal blade from being fractured by stress, the connection part has a stress distribution part as a means for distributing the stress. However, since a diameter of the endodontic file is as small as about 1 mm to 2 mm, it is practically impossible for the tissue removal blade not to be fractured. Therefore, as shown in FIG. 3A, when the endodontic file of the prior art rotates in the root canal, the tissue removal blade having a thinner thickness than that of the stress distribution portion is fractured, and small fragments generated from the fracture of the tissue removal blade are stuck inside the root canal and difficult to remove.

In contrast, as shown in FIG. 3B, the connection part 300 of the endodontic file 1 of the present invention may be formed to have a thinner thickness than that of the blade 100 to be more easily fractured by stress than the blade 100.

Accordingly, since a cross sectional area of the connection part 300 reduces, the pressure relatively increases or the stress is concentrated on the connection part 300, and thus, the connection part 300 can be fractured earlier than the blade 100. The fractured fragments generated by the fracture of the connection part 300 are relatively large in size compared to the fragments generated by fracture of the tissue removal blade of the prior art, so the large fragments can be easily discovered. In addition, since the fragments from the connection part 300 are generated outside the root canal, they can be easily removed.

In summary, according to the prior art, fragments of the tissue removal blades may remain in the root canal. If the fractured pieces of the tissue removal blades present in the root canal are not removed in time, it may cause inflammation in the root canal and further cause serious problems in the teeth. On the other hand, the present invention has a characteristic of prioritizing safety of the human body over durability with the improved endodontic file 1 by designing the connection part 300 as a fracturable range.

In addition, the connection part 300 may be formed in a specialized structure to further enhance the characteristics of the present invention. The specialized structure will be described with reference to FIGS. 4A to 8.

Figure 4A:
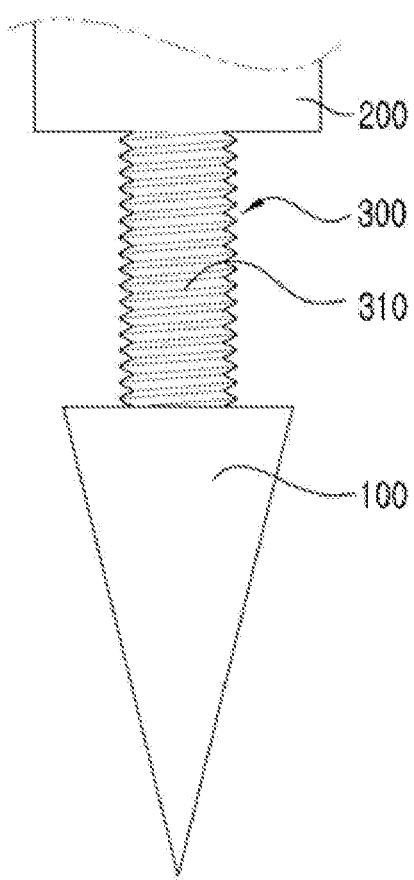
FIGS. 4A-4B are cross sectional views illustrating deformed structures of the connection part of the endodontic file according to the present invention.
Figure 4B:
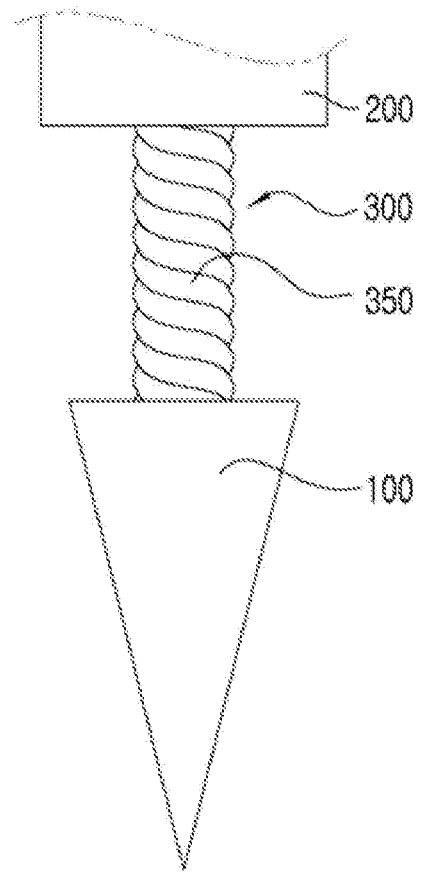

FIGS. 4A-4B are cross sectional views illustrating deformed structures of the connecting part according to the present invention.

Referring to FIG. 4A, a surface of the connection part 300 is formed with a recessed spiral groove in the same shape as a screw thread 310. By forming the screw thread 310 on the connection part 300, the screw thread 310 generates a centripetal force during rotation of the head 200 and can concentrate an external force on the connection part 300. Accordingly, the screw thread 310 allows the connection part 300 to be fractured first before the blade 100 when the endodontic file 1 is fractured in operation. In addition, since the screw thread 310 can reduce an area in contact with the tooth while the connection part 300 is inserted into the tooth, a frictional force between the tooth and the endodontic file 1 can be minimized, thereby allowing the endodontic file 1 to be gently inserted into the tooth without unnecessary irritation. In this case, a diameter of the connection part 300 on which the screw thread 310 is formed can be formed in various sizes, and it can be selectively used according to the purpose and situation.

As shown in FIG. 4B, an eccentric groove 350 formed in a screw shape may be formed on the surface of the connection part 300

The eccentric grooves 350 are formed to be recessed in such a way that a plurality of grooves formed on a circumference of a lower portion of the connection part 300 at regular intervals are extended in parallel in a twisted form toward an upper portion of the connection part 300 along an outer circumferential surface of the connection part 300. By forming the eccentric groove 350 on the surface of the connection part 300, it is possible to provide a function similar to the screw thread 310 described above. The eccentric groove 350 provides a groove with a larger area than that of the screw thread 310, and thus, the eccentric groove 350 can distribute a centripetal force generated during rotation of the head 100, thereby preventing the connection part 300 from being fractured too easily.

Figure 5:
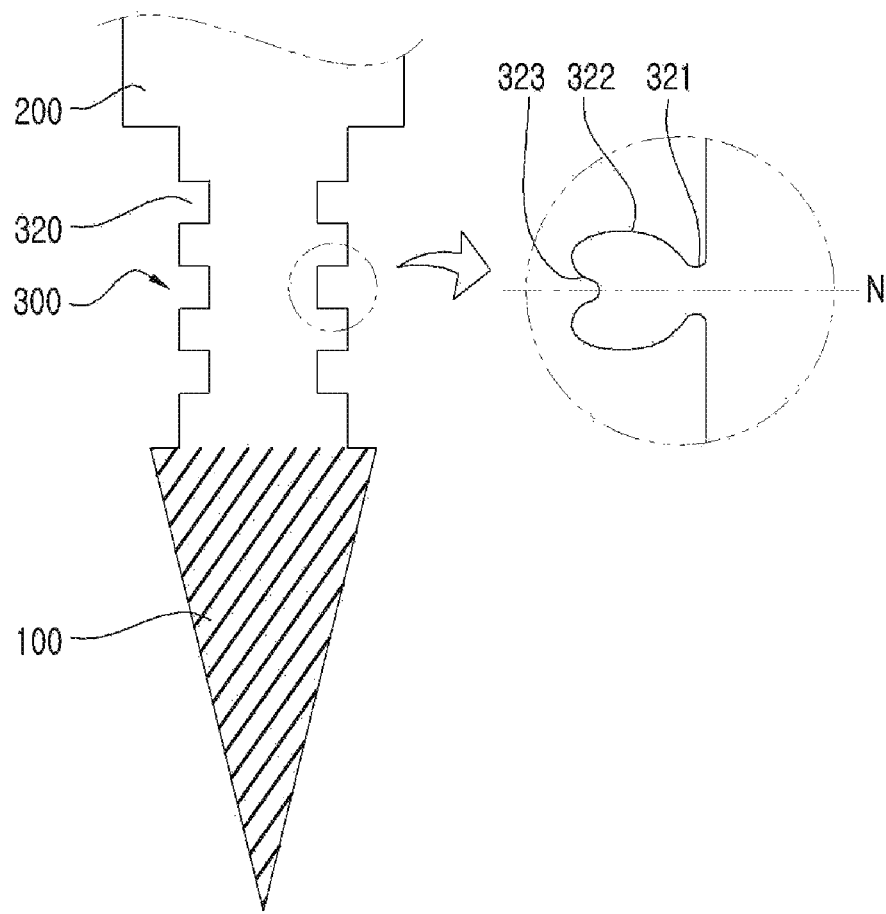
FIG. 5 is a cross sectional view illustrating a structure in which a slit is formed on the connection part of the endodontic file according to the present invention.

FIG. 5 is a cross sectional view illustrating a structure in which a slit is formed on the connection part of the endodontic file according to the present invention.

Referring to FIG. 5, a recessed slit 320 is formed on the surface of the connection part 300 along a circumference of the surface. The slit 320 is provided in the connection part 300 to make a diameter of the connection part 300 thinner. Since a portion of the slit 320 of the connection part 300 has a relatively thin thickness compared to other portions of the connection part 300 without the slit 320, stress is concentrated on the portion with the slit 320 and may be more easily fractured. In this case, by forming a plurality of slits 320 at regular intervals along the longitudinal direction of the connection part 300, a range on which the stress is concentrated expands, thereby increasing the possibility of fracture of the connection part 300.

In addition, since a portion of the slit 320 of the connection part 300 is likely to be unnecessarily fractured, a recessed shape of the slit 320 may be specially processed to prevent unnecessary fracture.

As shown in FIG. 5, the recessed shape of the slit 320 may be formed to be rounded as a whole.

Specifically, a cross section of the recessed shape of the slit 320 includes a first rounded section 321, a second rounded section 322, and a third rounded section 323.

The recessed shape of the slit 320 may be formed to be rounded as a whole as shown in FIG. 5. The first rounded section 321 is a portion extended to protrude from a recess introduction portion of the slit 320, that is, a portion where a recess starts, toward a center of the slit 320 to be rounded with a first radius of curvature. A second rounded section 322 is a portion extended to be recessed from an end of the first rounded section 321 toward a bottom surface of the slit 320 with a second radius of curvature. In this case, by forming the second radius of curvature larger than the first radius of curvature, the recessed shape of the second rounded section 322 is more gradual than that of the first rounded section 321, and thus, the second rounded section 322 may have a larger area than a first rounded section 321.

These first and second rounded sections 321 and 322 can be formed to have a symmetrical structure based on an imaginary line N connected from the recess introduction portion of the slit 320 to the bottom surface of the slit 320 to pass a center point of a diameter of the connection part 300. In this case, a third rounded section 323 may be formed at a portion of the imaginary line N where the symmetrically formed second rounded sections 322 meet each other.

The third rounded section 323 may be formed to protrude toward the recess introduction portion of the slit 320 with a third radius of curvature. In this case, the third radius of curvature is smaller than the first and second radius of curvature. That is, the second radius of curvature is the largest and followed by the first radius of curvature and the third radius of curvature in order.

Functions and actions according to the recessed shape of the slit 320 will be described as follows.

The first rounded section 321 can prevent the endodontic file 1 from being easily fractured by an external force by reducing a diameter of the recess introduction portion of the slit 320 and can perform a role distributing an external force to prevent the external force from being instantaneously concentrated on the third rounded section 323. Specifically, since the end of the first rounded section 321 and an end of the second rounded section 322 are smoothly connected to each other in a rounded shape, and the external force can be naturally distributed to the first rounded section 321 and its periphery areas, the connection part 300 can be prevented from being fractured too easily by the external force generated during use of the endodontic file 1.

The second rounded section 322 has a rounded shape rather than a straight shape and is formed to expand the recessed range of the slit 320 to have a larger radius of curvature than the first rounded section 321. Accordingly, the second rounded section 322 performs a role preventing the external force distributed to the periphery areas of the first rounded section 321 from causing fracture in an oblique direction rather than a direction of the third rounded section 323 and guiding the external force to be concentrated on the third rounded section 323. In this case, since the second rounded section 322 is formed in a rounded shape rather than a straight line, the second rounded section 322 can allow the external force to be partially distributed in an eccentric direction from a central axis of the connection part 300 rather than to be concentrated on the central axis of the connection part 300. That is, the second rounded section 322 also has a function to adjust the direction of the external force so that the external force is not guided to the direction of the third rounded section 323 too easily. Accordingly, the second rounded section 322 not only serves to limit the fracturable portion in the connection part 300 but also transmits the stress transmitted from the first rounded section 321 to the direction of the third rounded section 323 while partially distributing the stress to the periphery areas. That is, the second rounded section 322 provides a function of preventing the connection part 300 from being fractured at an angle or being fractured too easily.

The third rounded section 323 is formed to protrude from the central axis of the connection part 300 toward the recess introduction portion of the slit 320, thereby reinforcing the diameter of the central axis of the connection part 300. That is, the third rounded section 323 keeps the thickness of the connection part 300 in a thick state to prevent the connection part 300 from being fractured too easily. In addition, since the third rounded section 323 protrudes in a rounded shape, the third rounded section 323 can have a larger volume than in a pointed shape. Accordingly, the third rounded section 323 serves to prevent the external force from being instantaneously concentrated thereto and fracturing it too easily.

In summary, the slit 320 recessed in a form described above sets the connection part 300 as a fracturable area and guides the external force to the direction of the central axis of the connection part 300 while partially distributing the external force to the periphery areas so that the connection part 300 is not fractured too easily.

Figure 6:
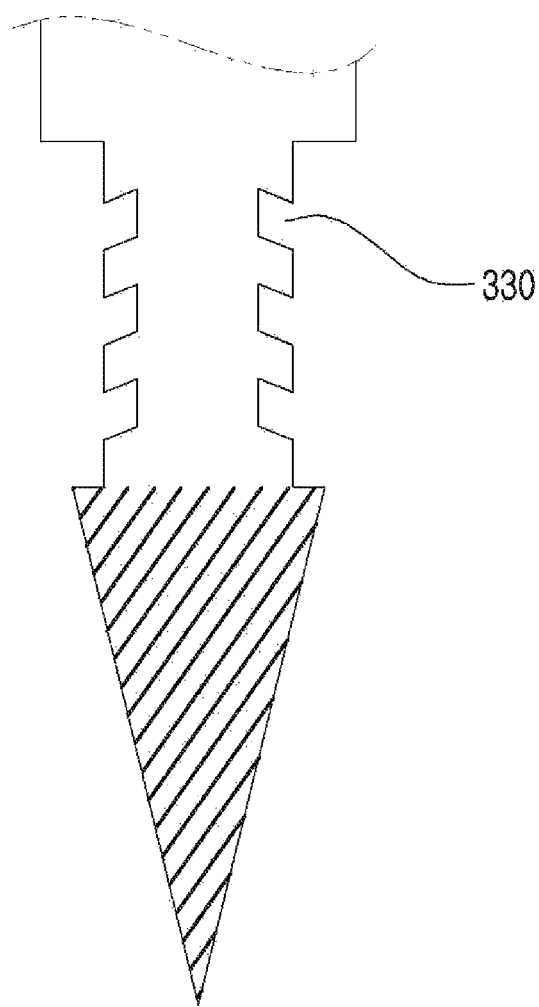
FIG. 6 is a cross sectional view illustrating a structure in which an eccentric slit is formed on the connection part of the endodontic file according to the present invention.

FIG. 6 is a cross sectional view illustrating a structure in which an eccentric slit is formed on the connection part of the endodontic file according to the present invention.

As shown in FIG. 6, like the slit 320 described above, a plurality of recessed grooves may be formed on the surface of the connection part 300 at regular intervals along the longitudinal direction of the connection part 300. This recessed groove forms a different shape from that of the slit 320 described above. In the present invention, the recessed groove shown in FIG. 6 is referred to as an eccentric slit 330.

The eccentric slit 330 is a groove recessed in an inclined shape toward the head 200 along a circumference of the surface of the connection part 300. The eccentric slit 330 also concentrates an external force transmitted to the endodontic file 1 on the connection part 300 and generates stress on the connection part 300 to increase a possibility that the connection part 300 can be fractured. In addition, since the eccentric slit 330 is recessed toward the head 200, the stress concentrated on the connection part 300 is guided toward the head 200 and induces a portion of the connection parts 300 positioned close to the head 200 to be fractured, thereby making the fractured area relatively longer and larger.

Figure 7A:
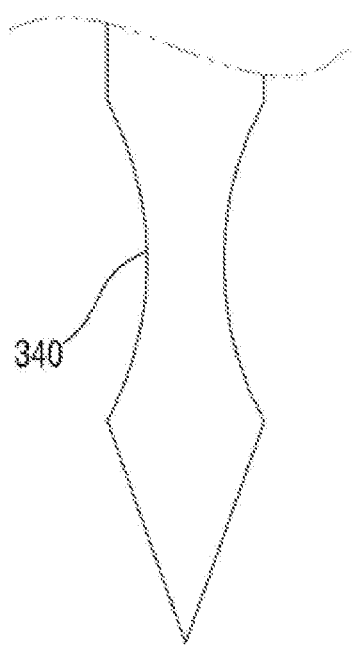
FIGS. 7A-7B are cross sectional views illustrating a structure in which a concave part is formed on the connection part of the endodontic file according to the present invention.
Figure 7B:
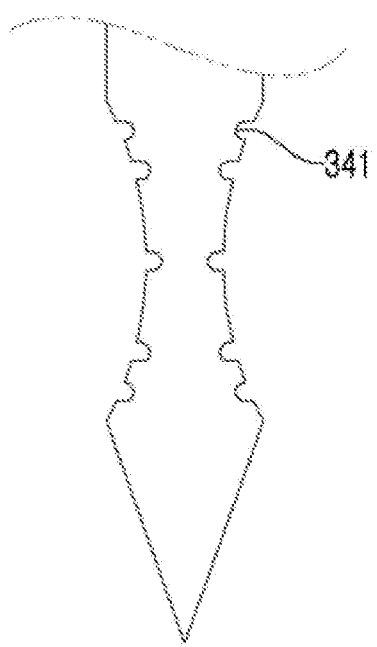

FIGS. 7A-7B are cross sectional views illustrating a structure in which a concave part is formed on the connection part of the endodontic file according to the present invention.

Referring to FIG. 7A, a concave part 340 performing a similar function to that of the slit 320 of FIG. 5 is formed on a surface of the connection part 300.

The concave part 340 has a shape concavely recessed to a predetermined depth along the longitudinal direction of the connection part 300. Specifically, the concave part 340 is formed in a bilateral symmetrical structure and positioned in a central portion of the connection part 300 in the longitudinal direction of the connection part 300, so that a thickness of the central portion of the connection part 300 is thinner than that of the other portions of the connection parts 300. Since the concave part 340 with a small diameter is provided on the surface of the connection part 300, if the endodontic file 1 is fractured, the concave part 340 of the connection part 300 is more likely to be fractured than other portions of the endodontic file 1.

In addition, although not shown in the drawings, the concave part 340 may be provided in the portion close to the head 200 other than in the central portion. Specifically, a diameter of a portion of the connection part 300 close to the head 200 may be thin and a diameter of a portion of the connection part 300 close to the blade 100 may be thick. Accordingly, since the portion of the connection part 300 close to the head 200 is likely to be fractured, a larger fractured piece can be formed as result of fracture, and they can be easily collected.

Referring to FIG. 7B, a recessed groove 341 recessed along a circumference of the surface of the connection part 300 may be formed around the concave part 340.

These recessed grooves 341 may be formed in the central portion of the connection part 300 in which the concave part 340 is formed, or two to four of recessed grooves 341 may be formed at a predetermined interval around a periphery area of the central portion of the connection part 300. The recessed groove 341 may provide a function of assisting the concave part 340 by inducing stress to be concentrated thereto and the connection part 300 to be fractured.

Figure 8:
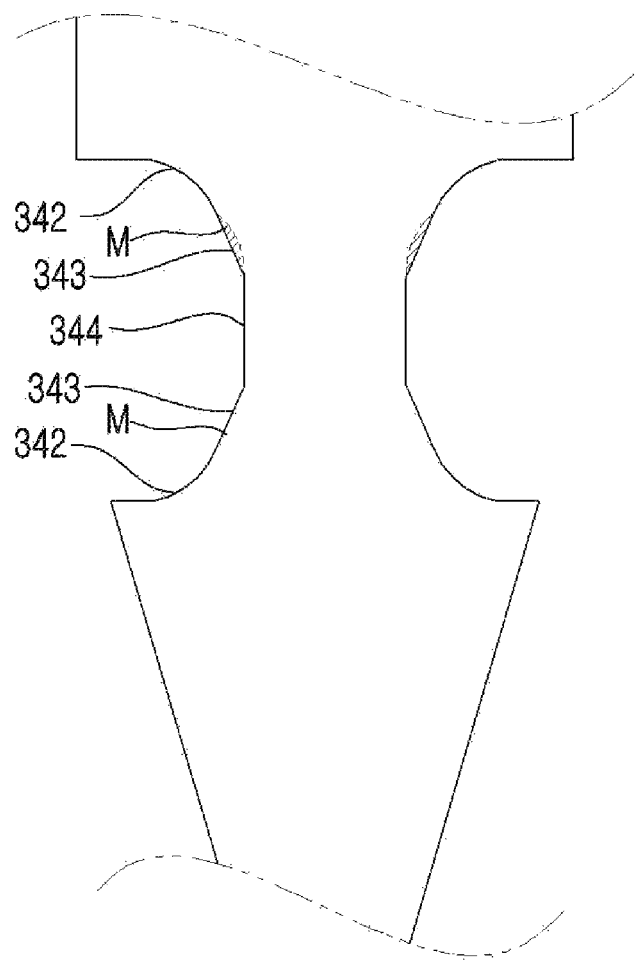
FIG. 8 is a cross sectional view illustrating a deformed state of the concave part formed on the connection part of the endodontic file according to the present invention.

FIG. 8 is a cross sectional view illustrating a deformed state of the concave part formed on the connection part of the endodontic file according to the present invention.

As shown in FIG. 8, a cross section of the concave part 340 formed in the connection part 300 described above includes a first extension part 342, a second extension part 343, and a third extension part 344.

First, the first extension part 342 is a portion concavely recessed to be rounded toward the central portion of the connection part 300 from a boundary portion with the head 200, that is, from a portion where the connection part 300 and the head 200 are connected. Similarly, the first extension part 342 concavely recessed toward the central portion is also formed from a boundary portion where the connection part 300 and the blade 100 are connected.

The second extension part 343 extended to be inclined toward the central portion of the connection part 300 is connected to an end of the first extension parts 342. A third extension part 344, which is a portion extended in parallel to a longitudinal direction of the head 200, is extended toward the central portion of the connection part 300 and is connected to an end of the second extension part 343.

A function and an operation according to a structure of the concave part 340 described above will be described as follows.

The first extension part 342 is formed such that each of boundary portions between the connection part 300 and each of the head 200 and the blade 100 has a larger diameter than other portions of the connection part 300. Accordingly, the connection part 300 and each of the head 200 and the blade 100 are stably connected to each other, thereby enabling the head 200 to effectively transmit a rotational force to the blade 100 and preventing the boundary portions between the connection part 300 and each of the head 200 and the blade 100 from being easily fractured. In addition, by forming the boundary portions between the connection part 300 and each of the head 200 and the blade 100 in a round shape, the first extension part 342 can be prevented from being unnecessarily fractured by an external force.

The second extension part 343 may form a correction part M for correcting a diameter of the connection part 300. That is, the correction part M corrects a portion of the diameter of the connection part 300 that decreases from the first extension part 342 to the third extension part 344 to have a larger diameter than the third extension part 344.

Specifically, if the second extension part 343 is not formed, since an introduction portion of the third extension part 344, a portion where the first extension part 342 and the third extension part 344 are connected, has a small diameter, an external force can be instantaneously concentrated on the connection part 300, and the connection part 300 can be easily fractured. However, according to the present invention, the correction part M of the second extension part 343 that enlarges the diameter of the connection part 300 can provide a cushioning function, which can distribute an external force concentrated on the third extension part 344 to the periphery areas. In this case, since it is difficult to form the second extension part 343 as a curved shape as the second extension part 343 extends from the end of the concavely recessed shape of the first extension part 342 toward the central portion of the connection part 300, it is desired to form the second extension part 343 as a straight line.

The third extension part 344 is a portion on which an external force is concentrated so that the connection part 300 is fractured when the endodontic file 1 is fractured. Since the connection part 300 with the third extension part 344 has a smaller diameter compared to those in other portions, the connection part 300 can be fractured more easily. In this case, the third extension part 344 is formed along a direction parallel to the longitudinal direction of the head 200 rather than formed in a concavely recessed shape toward the central axis of the connection part 300. Accordingly, since the diameter of the central portion of the connection part 300 can be adjusted to be large, the connection part 300 can be prevented from being too easily fractured.

Figure 9:
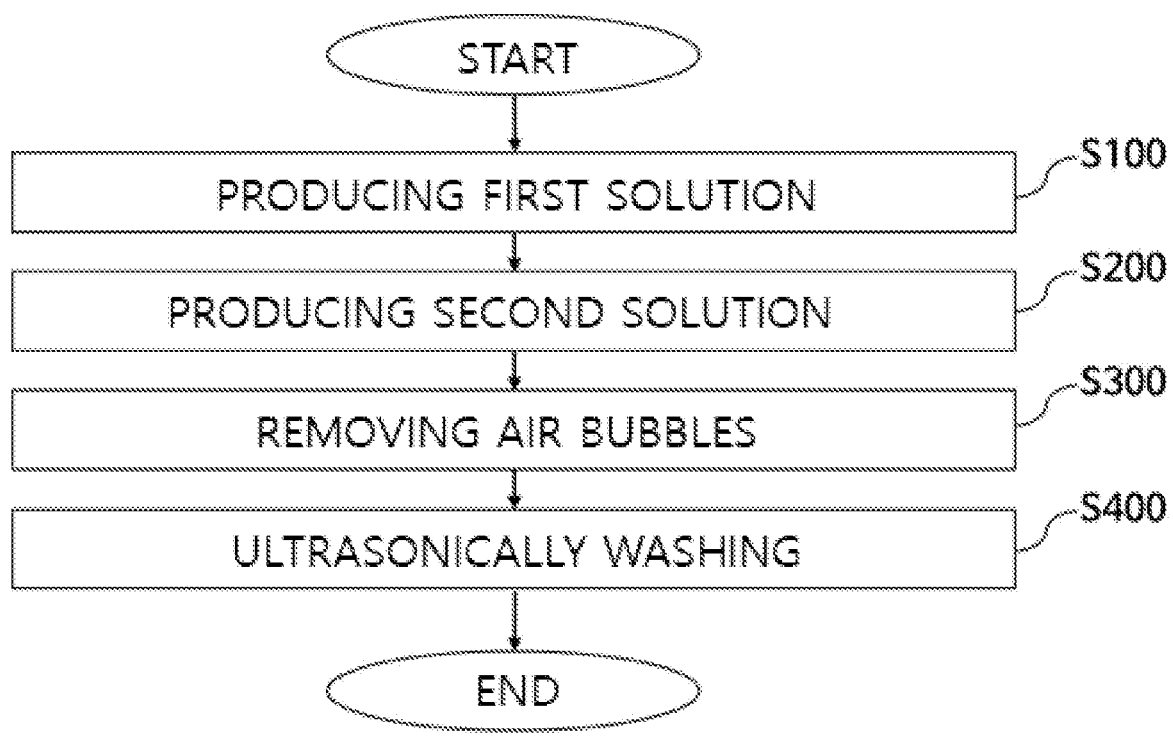
FIG. 9 is a flow chart illustrating a process of manufacturing a coating layer formed on the connection part of the endodontic file according to the present invention.

FIG. 9 is a flow chart illustrating a process of manufacturing a coating layer formed on the connection part of the endodontic file according to the present invention.

A coating layer on the surface of the connection part 300 can be formed by a process of applying a coating solution containing silicon on the surface of the connection part 300 and then irradiating ultraviolet rays for 1 to 10 minutes. The surface of the connection part 300 can be protected by the coating layer, and rigidity and stability can be improved, thereby preventing the connection part 300 from being bent or cut.

The coating solution having such properties may be produced through steps of producing a first solution S100, producing a second solution S200, removing air bubbles S300, and washing S400.

First, a step of producing a first solution is performed by mixing 30 to 60 wt % of polyurethane acrylate, 15 to 50 wt % of hexanediol diacrylate, and 15 to 40 wt % of trimethylolpropane triacrylate, with respect to the total weight of the first solution. The step of producing a first solution also includes a process of producing organic material contained in the coating solution by mixing an ultraviolet curable oligomer, polyfunctional monomers such as polyurethane acrylate, hexanediol diacrylate, and trimethylolpropane triacrylate. Meanwhile, according to the description above, the coating solution of the present invention contains inorganic material such as silicon. In addition to this, the coating solution can be produced by mixing the first solution containing organic material and inorganic material such as silicon. Accordingly, physical properties of the inorganic material and the organic material can be mutually complementary.

Next, the step of producing a second solution is performed by mixing 40 to 60 wt % of the first solution, 30 to 50 wt % of complex containing zinc sulfide powder, and 1 to 10 wt % of hydroxy cyclohexyl phenyl ketone (HCPK) with respect to the total weight of the second solution and then stirring them for 5 to 10 hours.

In this case, HCPK performs a function as a photoinitiator. Since the complex is made of zinc sulfide powder as main material and thus can improve the strength of the coating layer, it can more effectively protect a bent portion of the endodontic file 1 of the present invention. A detailed description of the complex will be described later.

Then, the step of removing air bubbles is performed by ultrasonically cleaning the second solution at 40 to 60° C. for 10 to 60 minutes and then placing it at 20 to 30° C. for 10 to 60 minutes. By removing the air bubbles in the second solution, it is possible to prevent deterioration of adhesion and protective ability of the coating layer due to the bubbles.

Lastly, the step of washing is performed by ultrasonically washing the bubble removed second solution, with methanol. Since ultrasonic cleaning can effectively remove impurities remaining in the bubble removed second solution, a high quality coating solution can be produced.

Since the completed coating solution is produced by mixing organic material and inorganic material, which can complement physical properties of each other, it is possible to form a durable coating layer on the surface of the bent part of the present invention.

In this case, the complex described above may be produced through steps of producing mixed resin, cooling, reheating, tensioning or stretching, and completing complex.

First, the step of producing mixed resin is performed by mixing and compressing 55 to 85 wt % of polypropylene resin and 15 to 45 wt % of nanoclay with respect to the total weight of the mixed resin, heating the mixed resin to melt at 200 to 300° C., and then spinning the mixed resin in a form of thread. In this case, polypropylene resin is material with excellent mechanical properties due to strong rigidity, and good heat resistance and crystallinity. Nanoclay (Cloisite Na+) is material with excellent tensile strength, thermal stability, and mechanical properties.

Here, the polypropylene resin and the nanoclay are processed by compression and heating and become in an emulsion state. The mixed resin in the emulsion state is melted by a high temperature screw, and at the same time, the complex resin is pushed out and spun in the form of thread through a nozzle. In addition, if heating temperature is too high, the mixed resin can be carbonized and may interfere with movement of the screw. Accordingly, it is desired to proceed the heating process in a temperature range of 200 to 300° C.

Next, the step of cooling is performed by cooling and curing the mixed resin at 10 to 25° C. for 1 to 10 hours. Through this cooling process, the spun mixed resin may be immersed in a cooling tank filled with water at 10 to 25° C. and can be cooled. It is desired to proceed the cooling process within the temperature range described above. If the cooling process is performed at a temperature lower than the temperature range described above, a problem may occur when reheating the cured resin in the next process.

Thereafter, the step of reheating is performed by reheating and melting the cured mixed resin at 100 to 200° C. The step of tensioning is performed by tensioning or stretching the melted mixed resin. In this case, by performing a process of reheating the mixed resin, tensile strength and elasticity may be improved. Moreover, by performing a process of tensioning or stretching the reheated mixed resin through a roller, elasticity and strength may further increase through this process.

Finally, the step of completing complex is performed by pulverizing the tensioned mixed resin in a form of a powder. This powder type complex produced through this process can be mixed with the coating solution described above to improve mechanical properties of the coating layer such as strength and elasticity. Accordingly, the surface of the connection part 300 can be effectively protected and deformation of the connection part 300, such as cut, bent, and the like, can be prevented.

Although the endodontic file for dental nerve treatment according to the present invention is illustrated in the above description and drawings, these are examples for explanation. The spirit of the present invention is not limited to the above description and drawings, and various changes and modifications are possible without departing from the technical spirit of the present invention.

INDUSTRIAL APPLICABILITY

As described above, the endodontic file for dental nerve treatment with improved fracturing area according to the present invention has the following technical effects, and thus, the endodontic file of the present invention has very high industrial applicability. That is, by forming a connection part of the endodontic file with a thinner thickness, the connection part of the endodontic file receives more stress than a part inserted into the tooth root, and thus, the endodontic file is fractured outside the tooth, not inside the tooth root, thereby allowing fractured pieces to be easily found and removed. In addition, by forming a plurality of slits on a portion of the surface of the endodontic file and specializing these slits, stress can be distributed over the entire endodontic file so that the endodontic file is not easily fractured as a whole. In addition, even if the endodontic file is fractured, since a diameter of the slit area is smaller than those of other areas, fracture can be formed in the slit area. Furthermore, by forming a portion of the surface of the endodontic file in a concavely recessed form, stress can be concentrated on the concave area and fracture can be formed in this area. Furthermore, the concavely recessed area with an improved shape can prevent excessive concentration of stress. In addition, by providing a coating layer formed on a portion of the endodontic file through a specific component and a manufacturing method, durability of the endodontic file can be strengthened, and the endodontic file can be prevented from being easily fractured.

What is claimed is:

1. An endodontic file with an improved fracturable area for dental nerve treatment, the endodontic file comprising:
   a helical shaped blade that is to be inserted into a root canal, remove dental nerve, and enlarge the root canal;
   a head that is detachably inserted into a rotary power tool; and
   a connection part extending by a predetermined length between the head and the blade and having a diameter smaller than that of each of a contact end of the blade and the head,
   wherein a coating layer is formed on a surface of the connection part through a process of coating the surface of the connection part with a coating solution containing zinc sulfide powder and then irradiating the surface of the connection part with ultraviolet rays for 1 to 10 minutes,
   wherein the connection part is formed with a plurality of slits that are recessed at regular intervals along a longitudinal direction of the connection part along a circumference of the surface of the connection part,
   wherein a cross section of the slit is provided with:
   a first rounded section extended to protrude from a portion where a recess starts toward a center of the slit to be rounded with a first radius of curvature;
   a second rounded section extended to be recessed from an end of the first rounded section toward a bottom surface of the slit with a second radius of curvature that is larger than the first radius of curvature; and a third rounded section extended from an end portion where the second rounded section approaches a middle axis of the slit that is perpendicular to a longitudinal axis of the connection part and protruding toward a portion where the recess starts, with a third radius of curvature that is smaller than the first and the second radius of curvature.

2. The endodontic file of claim 1, wherein the connection part is formed with a plurality of eccentric slits that are recessed toward the head at regular intervals along the longitudinal direction of the connection part along the circumference of the surface of the connection part.

3. The endodontic file of claim 1, wherein the connection part is provided with a concave part that is formed to be concavely recessed in a bilateral symmetrical structure so that a thickness of a central portion of the connection part in the longitudinal direction is the thinnest.

4. The endodontic file of claim 3, wherein the concave part is formed with two to four recessed grooves that are recessed around a periphery area of the central portion of the connection part at regular intervals along the circumference of the surface of the connection part.

5. The endodontic file of claim 3, wherein a cross section of the concave part formed is provided with:

a first extension part extended to be concavely recessed to be rounded toward the central portion of the connection part from a boundary portion of each of the head and the blade;

a second extension part extended to be inclined toward the central portion of the connection part from an end of the first extension part; and a third extension part extended in parallel to a longitudinal direction of the head to the central portion of the connection part from an end of the second extension part.

6. The endodontic file of claim 1, wherein the coating solution is produced through steps of:

producing a first solution by mixing 30 to 60 wt % of polyurethane acrylate, 15 to 50 wt % of hexanediol diacrylate, and 15 to 40 wt % of trimethylolpropane triacrylate, with respect to the total weight of the first solution;

producing a second solution by mixing 40 to 60 wt % of the first solution, 30 to 50 wt % of a complex containing zinc sulfide powder, and 1 to 10 wt % of hydroxy cyclohexyl phenyl ketone (HCPK) with respect to the total weight of the second solution and then stirring them for 5 to 10 hours;

removing air bubbles by ultrasonically cleaning the second solution at 40 to 60° C. for 10 to 60 minutes and then placing it at 20 to 30° C. for 10 to 60 minutes, and ultrasonically washing the air bubble removed second solution with methanol.

7. The endodontic file of claim 6, wherein the complex is produced through steps of:

producing mixed resin by mixing and compressing 55 to 85 wt % of polypropylene resin and 15 to 45 wt % of nanoclay with respect to the total weight of the mixed resin, heating the mixed resin to melt at 200 to 300° C., and then spinning the mixed resin in a form of thread;

cooling and curing the mixed resin at 10 to 25° C. for 1 to 10 hours;

reheating and melting the cured mixed resin at 100 to 200° C.;

tensioning or stretching the melted mixed resin, and completing the complex by pulverizing the tensioned mixed resin in a form of a powder.

* * * * *